United States Patent
Shiloh

(10) Patent No.: US 8,112,405 B2
(45) Date of Patent: *Feb. 7, 2012

(54) METHOD AND SYSTEM FOR SECURING USER IDENTITIES AND CREATING VIRTUAL USERS TO ENHANCE PRIVACY ON A COMMUNICATION NETWORK

(76) Inventor: Dekel Shiloh, New York, NY (US)

( * ) Notice: Subject to any disclaimer, the term of this patent is extended or adjusted under 35 U.S.C. 154(b) by 446 days.

This patent is subject to a terminal disclaimer.

(21) Appl. No.: 12/178,725

(22) Filed: Jul. 24, 2008

(65) Prior Publication Data

US 2009/0024636 A1  Jan. 22, 2009

Related U.S. Application Data

(63) Continuation of application No. 09/814,451, filed on Mar. 22, 2001, now Pat. No. 7,412,422.

(60) Provisional application No. 60/191,625, filed on Mar. 23, 2000.

(51) Int. Cl.
G06F 17/30 (2006.01)
(52) U.S. Cl. ............... 707/705; 707/999.01; 726/28
(58) Field of Classification Search .......... 705/43, 705/40, 74, 75; 707/999.01, 705; 726/28
See application file for complete search history.

(56) References Cited

U.S. PATENT DOCUMENTS

| | | | | |
|---|---|---|---|---|
| 5,987,440 A | * | 11/1999 | O'Neil et al. | 705/44 |
| 6,005,939 A | * | 12/1999 | Fortenberry et al. | 705/76 |
| 6,304,860 B1 | * | 10/2001 | Martin et al. | 705/43 |
| 6,574,239 B1 | * | 6/2003 | Dowling et al. | 370/469 |
| 7,089,208 B1 | | 8/2006 | Levchin et al. | |
| 7,289,971 B1 | * | 10/2007 | O'Neil et al. | 705/44 |
| 7,412,422 B2 | * | 8/2008 | Shiloh | 705/74 |
| 8,001,612 B1 | * | 8/2011 | Wieder | 726/28 |
| 2002/0055833 A1 | | 5/2002 | Sterling | |

FOREIGN PATENT DOCUMENTS

JP  2005190480  7/2005

OTHER PUBLICATIONS

Office Action for U.S. Appl. No. 09/814,451 mailed on Apr. 22, 2003.
Office Action for U.S. Appl. No. 09/814,451 mailed on Dec. 4, 2003.
Office Action for U.S. Appl. No. 09/814,451 mailed on Jun. 24, 2004.

(Continued)

Primary Examiner — Jean M Corrielus
(74) Attorney, Agent, or Firm — Shiloh et al.

(57) ABSTRACT

A method of enabling a real entity to access a service on a communication network using a virtual entity, the method including the steps of establishing a user account including at least first data corresponding to the identity of the real entity and second data corresponding to the virtual entity and not identifying the real entity, storing the first and second data in a first database, linking between the first and second data in the first database, storing the second data at a second database, associating the second database with a communication network site, connecting the communication network site to the communication network, receiving the second data from an unidentified user on the communication network site, identifying the unidentified user as the virtual entity based on receiving the second data, and allowing the virtual entity to access the service.

19 Claims, 5 Drawing Sheets

OTHER PUBLICATIONS

Office Action for U.S. Appl. No. 09/814,451 mailed on Jan. 6, 2005.
Office Action for U.S. Appl. No. 09/814,451 mailed on May 24, 2006.
Office Action for U.S. Appl. No. 09/814,451 mailed on Apr. 16, 2007.
Final Office Action for U.S. Appl. No. 09/814,451 mailed on Nov. 1, 2007.
Final Office Action for U.S. Appl. No. 09/814,451 mailed on Nov. 16, 2007.
Office Action for U.S. Appl. No. 09/814,451 mailed on Nov. 2, 2006.
Office Action for U.S. Appl. No. 09/814,451 mailed on Sep. 15, 2005.

* cited by examiner

METHOD AND SYSTEM FOR SECURING USER IDENTITIES AND CREATING VIRTUAL USERS TO ENHANCE PRIVACY ON A COMMUNICATION NETWORK

CROSS REFERENCE TO RELATED APPLICATIONS

This Application is a continuation of U.S. patent application Ser. No. 09/814,451, filed on Mar. 22, 2001, and issued a U.S. Pat. No. 7,412,422, which claims the benefit of and priority under 35 U.S.C. §119 from U.S. Provisional application Ser. No. 60/191,625, filed on Mar. 23, 2000, entitled "METHOD AND SYSTEM FOR SECURING USER IDENTITIES AND CREATING VIRTUAL USERS TO ENHANCE PRIVACY ON A GLOBAL COMMUNICATION NETWORK," the entire disclosure of which is incorporated herein by reference.

FIELD OF THE INVENTION

The present invention relates generally to enhancing user privacy on a communication network, and more specifically to a method and system for securing user identities and creating virtual users to enhance privacy on a computer communication network.

BACKGROUND OF THE INVENTION

The Internet is a global computer communication network serving as a public arena for hundreds of millions of users worldwide. According to recent studies, the Internet penetration in the United States has reached 60 percent of the population. Currently, there is a steady growth in Internet use, in the number of Internet sites and in the size and complexity of website content. New sites are born and improved every day, and new users join the Internet world.

The two main activities of Internet users are browsing the World Wide Web and using electronic mail ("e-mail"). Billions of email messages are sent and received every day via the World Wide Web ("Web"). Browsing the Web includes many different activities, ranging from online research, leisure "surfing", playing games, reading news, downloading and uploading files, experiencing multimedia presentations, online chats and instant messaging, and engaging in electronic commerce.

Only a few years ago, when the Internet started penetrating people's everyday life, Internet users were still naive. Many users still believe that most of their online interactions are anonymous and private. For example, a user who visits a certain website may have the conception that the website (or the people operating the website) has no knowledge about the user.

In the past few years, particularly in the last 2 years, Internet users have undergone a change in attitude. Users are awakening, one after the other, from the online anonymity dream, and into the cold reality that websites, and the entities and people that operate websites, meticulously collect user data, maintain it, manage it, and use it for many commercial purposes. All this is happening, most of the time, without the user's knowledge and without user consent.

Today, it is almost a well-known fact that online anonymity and online privacy are severely jeopardized. User's interactions are being systematically tracked and scrutinized. User's behavior and usage patterns are closely studied. User's information is subject to careful data-mining processes. User's personal information—including user name, address, email address, age, and gender—is often transferred to third parties, exploited and sold.

According to latest studies, an overwhelming majority of Internet users are concerned, or extremely concerned, about their online privacy, and many of those users are also concerned about the practice of corporate websites gathering marketing information by tracking consumers' online activity.

Recent studies indicate that efforts by various governments to protect online privacy are inadequate. For example, research clearly indicates that many Internet sites worldwide fall woefully short of international standards on data protection. Specifically, the research showed that over two-thirds of sites collect personal information of users, and almost all of those sites collect sufficient detail to identify and contact the person. Moreover, the vast majority of sites give users no choice about being on the site's own mailing list or having their name passed on to affiliates or third parties.

Further, recent studies indicate that Internet users are concerned about online security, and the majority of Internet users fear that sensitive information such as credit card numbers, social security numbers, information about financial assets, and contact information is compromised during communication with a website, even when communicating with generally trusted websites. According to these studies, nearly one quarter of online consumers do not purchase products or services online, citing fears about their credit card numbers being compromised and concern that their personal information may be abused as the top reasons. These concerns have a direct influence on the engagement of users in electronic commerce. According to the studies, concerns relating to online privacy and use of personal information result in a significant reduction of the potential revenues of electronic commerce, as many consumers simply refrained from Web shopping.

The rise of e-commerce enables marketers to capture bits and pieces of the user's buying and Web surfing habits. Database technology enables those bits and pieces of user's daily life—the matrix of the user's personal world—to be assembled and repackaged in various ways and sold to anyone wanting to target the user for both legitimate and illegal marketing purposes. These are examples of the negative aspects of the digital age.

Transactions performed over the Internet are of particular concern, because an online transaction cannot be successfully completed without revealing the user's identity, for billing purposes. Consumers in the traditional economy have the option of buying and selling almost anything with complete anonymity, e.g., a person can walk into a supermarket, a drugstore, a retail store, pick up a product, pay in cash, and physically carry the product, without providing any identifying details. The online shopping experience, however, is different. Even the simplest online transaction usually requires the purchaser to submit two types of information, namely, billing information, which including a full name, credit-card number, credit-card type and credit-card expiration date, and shipping information, which includes full name and full address to which the goods are to be shipped by the online merchant. Therefore, anonymous online shopping is impossible. The simple process of "buying for cash" is currently not available for Internet users.

This reality is problematic for a number of reasons. Most people have "nothing to hide", yet it is disturbing that submission of personal information is required for the simplest transaction, such as purchasing a book or a compact disc. Further, many people do not have credit cards, for various reasons. Other people do have credit cards, but do not wish to use it on the Internet for security reasons. The current practice for transacting over the Internet eliminates this group of users from participation in electronic commerce.

Additionally, certain types of online transactions tend to trigger privacy and anonymity concerns, for example, purchasing legal pornographic material, Internet activity relating to sensitive medical information, or purchases and research relating to analyzing business competitors.

One existing solution for Internet privacy is the use of a "proxy server" which links between the user's computer and websites visited by the user. The entity behind the website cannot capture the user's information; instead, the site may record only the identity of the proxy server. Internet users may subscribe to such a proxy server, such as the service available at Anonymizer.com.RTM.. It should be noted that the proxy servers such as Anonymizer.RTM. cannot guarantee its users perfect anonymity. One way in which anonymity can be compromised is through the use of "helper applications" on the Internet, for example, media viewers such as Real Player.RTM., which go around the proxy by establishing their own direct net connections. Further, the technical standards underlying the Web are constantly changing, hence potentially creating new routes around the Anonymizer.RTM.'s automatic link-rewriting mechanism. Nevertheless, research indicates that about five percent of Internet users have used or are using a proxy server to surf the Internet. It should be further noted that existing proxy server solutions do not address the problems discussed above relating to online transactions. These solutions do not provide a solution to the problem of websites requesting users to volunteer personal information to receive services.

Another existing solution for Internet privacy is web-based e-mail. Most Internet users have some form of a web-based email account. This free service is offered by numerous providers, for example Hotmail.RTM., available from Microsoft, Inc. At a first glance, creating and using web-based email seems like a good solution, enabling the user to create a pseudo-anonymous e-mail address which may be used for communicating with entities that are not within the user's immediate circle of acquaintances, such as online merchants. However, web-based email has many disadvantages. The user interface is often less comfortable, compared to that of a regular POP-based email client. Further, there are strict limitations on the mailbox and attachments sizes. Additionally, web-based service is clearly not anonymous, because the email header still contains the IP address of the sender. Further, web-based e-mail addresses are known to be the most common target for "junk" or "spam" e-mail, because various methods enable spammers to collect such email addresses and flood them with junk e-mail. Further, security breaches are common with web-based e-mail servers enable hackers to intercept and use other people's web-based e-mail accounts. Thus, many users periodically open new web-based e-mail accounts to avoid security breaches and "spam", resulting in a tedious and inconvenient use of those accounts. Further, web-based e-mail services do not enable anonymous transactions on the Internet. Finally, web-based e-mail accounts do not provide a solution for the problem of websites requesting users to volunteer personal information to receive services.

Existing efforts to secure people's identity on the Internet are not aimed at protecting privacy interests per se, but rather they are aimed at securing the identity of users' money interests (e.g., for the purpose of credit card fraud protection), primarily to the benefit of corporations such as the credit card companies. Further, it is a fact that no matter how brilliantly secured, the transfer of Information on the Internet is never completely safe, and the ability to intercept vital information is generally only a function of money. More importantly, whether justified or not, it is a fact that a growing number of Internet users are reluctant to join various services on the Internet in its existing structure, as discussed above.

SUMMARY OF THE INVENTION

The present invention seeks to enhance user activity on a large communication network, e.g., the Internet, by creating new users and enhancing the activity of existing users, through the creation of user-controlled, preferably customizable, virtual entities equipped with tools designed for effective interaction on the Internet. For practical purposes of interacting on a global communication network, such as the Internet, the virtual entities created in accordance with the invention may have the same functionality and powers as real entities interacting on the Internet. By creating virtual entities in accordance with the invention, the real users behind the virtual entities remain anonymous while interacting freely on the Internet and engaging in activities such as surfing, e-mailing, shopping, chatting or any other activity offered by Internet sites. The ability to interact with the Internet privately and efficiently, in accordance with the invention, is expected to promote Internet activity generally, and particularly monetary transactions over the Internet. Although the invention is described below in the context of a global communication network, it should be appreciated that the invention may also be adapted, with appropriate changes, to any other type of communication network, such as intranets, extranets and local networks.

The phrases "real entity", "real personality" or "real user", as used throughout this application, refer to a person or a corporation seeking to interact with the Internet, including but not limited to using an e-mail account through an Internet Service Provider ("ISP"), visiting and registering to websites (i.e., surfing the Internet), registering and transacting on an e-commerce website, engaging in an Internet site, and any other kind of Internet activity. The real entity has a real identity, which may include a given first and last name, a mailing address, a billing address, a telephone number, a social security number, a driver's license information, or any other information typically used to identify a legal entity, such as a person, a corporation or a non-profit organization.

The phrases "virtual entity", "virtual user" and "virtual personality", as used throughout the application, refer to an imaginary entity created solely for the purpose of interacting with a communication network. The virtual entities in accordance with the invention are preferably imaginary and have no pre-existing functionality in the real world; however, each virtual entity preferably represents a real entity, as defined above, and a real entity may be represented by more than one virtual entity. As described in detail below, a virtual entity in accordance with the invention may be provided with an e-mail account, virtual credit card information, e.g., a virtual credit card number and expiration date, an imaginary name, an imaginary address, a virtual social security number, and any other data that may be required for the Internet activity of the virtual entity. Once a virtual entity is created, in accordance with the invention, the virtual entity preferably interacts on the Internet just like a real entity would interact on the Internet. For example, the virtual entity may enter a chat room and interact with other real and/or virtual entities. The virtual entity may purchase products and services from Web-based businesses, using payment methods as described herein. The virtual entity may surf the Web using Web-based e-mail accounts. However, the activity of the virtual entity is preferably controlled by a real entity. Thus, the personality of the real entity, e.g., its unique interests, preferences, spending habits, or any other unique aspects of the real entity, may affect the way in which a corresponding virtual entity functions as an Internet user. For example, the real entity may seek only certain types of information or certain types of services or transactions available on the Internet and, therefore, various personality traits of the real entity may be reflected in the virtual entity.

The system of the present invention is generally referred to herein as an Anonymous Virtual Personality Provider (AVPP). In an exemplary embodiment of the invention, an AVPP may include an organization and/or a combination of computer hardware and/or software which provides services according to the system and method of the invention, such as an ISP, an Internet portal, financial services, shipping infrastructure, or any other system or organization that may be required in order to conduct business and/or to provide services on the Internet. For example, the AVPP may be an organization operating a server site or series of server sites providing access to the Internet and/or other services that may be required in order to implement and manage the virtual entities. In alternate embodiments of the invention, the AVPP may include several organizations, or may include hardware and/or software operated by one or more organization.

In accordance with an aspect of the invention, each user of the AVPP is provided with a virtual personality, which is fundamentally separated from the identity of the real user, as described in detail below. Using the virtual personality, the AVPP user may interact anonymously on the Internet; however, the AVPP system does not rely simply on concealing user identities. In accordance with some aspects of the invention, the virtual personality is provided with means for anonymously transacting on the Internet, e.g., spending money using a virtual transaction account, as described below. The virtual personality may also engage in any other type of Internet activity known in the art, such as chatting, surfing, building internet sites, etc., without ever disclosing details linked to the identity of the real user. The virtual personality may conduct research on the Internet, for example seeking information relating to a sensitive medical condition of the real user, or the virtual personality may subscribe to various Internet services, for example, services related to a business competitor of the real user. The virtual personality may also participate in "chat-rooms" or "game-rooms" or any other multi-user activities that the real user prefers to conduct in privacy. Thus, the AVPP system in accordance with the invention alleviates various concerns that are typically associated with Internet use, such as identity theft, tracking of user activity, and other objective and/or psychological concerns that are prevalent among Internet users. It should be appreciated that an environment of enhanced privacy will promote user creativity, e-commerce and the flow of information on the Internet, because privacy is an essential resource for many human activities. The AVPP system of the invention creates such an environment of privacy on the Internet, as described below.

One aspect of having a virtual personality is the power of reversibility. If something goes wrong in the Internet "life" of the virtual entity, for example, a romantic misunderstanding or an unsuccessful business venture, the real user always has the option to replace the virtual personality with a new virtual personality. In the process of building a new personality, the real user may have an opportunity to correct the mistakes of the previous virtual personality, even when interacting with the same entities. In contrast to the real life of the user, the Internet life of the virtual personality may be eternal, and may be continued by successors of the real user. Further, two or more real users may share the same virtual personality in a joint account, to create a more complex virtual personality.

The AVPP system is preferably contractually obligated to maintain in confidence any information that the real users may choose to disclose to the VASPP, in analogy to a Swiss bank institution. Further, the AVPP databases are preferably not part of the negotiable assets of the organization or organizations operating the AVPP. To accommodate users who are extremely privacy oriented, certain categories of users may be able to limit their relationship with the AVPP, wherein real user identities are not disclosed even to the organization or organizations operating the AVPP, as described below.

The AVPP in accordance with the invention implements fundamental separation between a user's real identity and the user's Internet identity (i.e., the virtual personality), whereby no information linked to the real identity is ever communicated via the Internet. According to this concept, The AVPP preferably consists of two separate sub-systems, namely, a virtual world system and a real world system. The two sub-systems do not communicate with each other via conventional Internet connections.

In one preferred embodiment of the invention, cash or other untraceable forms of payment, such as a money order or a negotiable bank note, collectively referred to herein as "cash equivalent", are the only means of communication between the real users and the AVPP. According to this embodiment, payments by the real users to the AVPP are made in cash or cash-equivalent, at pre-designated payment sites; e.g., Internet cafes, convenience stores, vending machines, etc., and the user receives a quota of Internet buying power in the form of a prepaid transaction account, e.g., in the form of a virtual debit-card. The pre-paid transaction account may be identified by an identification code, which may include a sequence of numerals and/or symbols physically printed on the face of a card, or a code which is magnetically, electronically or optically recorded on the card. The AVPP pre-paid transaction accounts may be issued in various denominations. Additionally or alternatively, the AVPP may assign each pre-paid account with a fictional user name and fictional user information, which information may be used to authenticate the pre-paid transaction account on the Internet whenever the user attempts to use the virtual transaction account through use of a virtual personality, as described below. This embodiment of the invention may be useful for extremely privacy-oriented users who are reluctant to disclose their real identity to anyone related to the Internet, including the AVPP.

In another preferred embodiment of the invention, a real user's identity is disclosed only to the AVPP, or to one or some of the organs of the AVPP, by conventional methods, e.g., in person, by mail, by phone, by direct connection, etc., depending on the level of comfort of the user in using any of those conventional methods. The AVPP may then provide the user with a virtual user name and virtual user information, which may include an identification code as in the previous embodiment, which may be used over the Internet to authenticate the user. Once the real user has been authenticated at an Internet site of the AVPP, which site may be accessed via standard Internet access tools, the real user may edit the virtual user information and/or add more information related to the virtual user. According to this embodiment, the linking between the real user information and the virtual user information is known only to the user and to an organ of the AVPP operating in the real world, i.e., off the Internet. Internet-accessed organs of the AVPP communicate only with the virtual user and do not store any information that may be traced back to the real user.

Once a virtual user has been created at the AVPP, according to either of the embodiments described above, or using any other suitable implementation of a separation between the virtual user and the real user, the virtual user is provided with a variety of optional tools, as may be required by a virtual entity. For example, the virtual entity may be provided with a transaction tool, e.g., in the form of a virtual credit or debit card number registered to the virtual entity. The transaction tool enables the virtual user to access Internet services, and to purchase products over the Internet at electronic retailer ("e-tailer") sites. Using the transaction tool, the virtual entity may also receive payments, for example, refunds from e-tailer sites for returned or damaged goods. The AVPP may include an accounting system in charge of issuing and billing virtual debit or credit accounts, and tracking payments credited to a given virtual user and payments made by such virtual user. Each virtual user account may have a spending limit, which may be based on the amount of money purchased using pre-paid transaction accounts, for completely anonymous users, or may be based on credit rating, for those users whose identities are known to the AVPP. However, even for those users whose identities are know to the AVPP, the linking between real identities and their corresponding virtual entities is accessible only within the internal accounting system of the AVPP, thereby fully protecting this crucial linking from being communicated over the Internet.

To secure the financial interests of the AVPP and its users, against Internet security breaches such as credit card theft, the AVPP system may incorporate information security solutions as are known in the art. Thus, the AVPP of the present invention does not obviate the need to physically secure the transfer of information on the Internet. However, the added value of the AVPP system and method is in protecting user privacy on the Internet by creating a fundamental separation between the virtual personalities and their corresponding real life identities, whereby real user identities are not compromised even when Internet security fails. This added value will become increasingly important as the Internet grows in size and sophistication.

As described above, the AVPP users are provided with virtual transaction accounts, which are backed by real funds or credit accounts within the AVPP system. Thus, the AVPP may provide its users with anonymous buying power, which may be pre-paid or backed by a credible billing system. Depending on whether the user chooses the constellation of full anonymity or relative anonymity, as described above, the AVPP may deduct a predetermined percentage from the funds made available to the transacting virtual entity, as a commission for the services of the AVPP. In some embodiments of the invention, these commissions may be offset by equal, or even larger, savings in the actual transactions, for example, if the AVPP contracts with various service providers and merchants on the Internet to lower prices due to the large number of anonymous users operating under the AVPP. Additionally or alternatively, the AVPP may charge each user a periodic fee for handling each anonymous Internet account, which fee may be used to cover the average costs of credit-card fraud and other liabilities and to support additional services that the AVPP may offer its users.

Most transactions on the Internet do not, inherently, require identification of the real entity making the transaction, such as the entity's mailing address. For example, "soft products" such as downloading software, music or video, "print-your-own" products such as uniquely bar-coded stamps or movie tickets, etc.), even hotel reservations. Such products do not require additional treatment by the AVPP once the anonymous payment method described above is implemented. However, in preferred embodiments, the AVPP also accommodates transactions that inherently require a mailing address, for example, purchasing products that must be shipped to the customer. To accommodate such transactions, the AVPP may establish physical mailboxes that are assigned to subscribers, under their virtual identity and may be accessed at locations affiliated with the AVPP. This solution may be suitable for those users who seek full anonymity, i.e., those who communicate with the AVPP only via transfer of cash or cash equivalent.

For users whose mailing addresses are disclosed to an organ of the AVPP, as part of the information needed to establish a transaction account, the AVPP may include a shipping division, which may be part of the real world sub-system of the AVPP. Alternatively, the AVPP may contract with a trusted third party to handle the shipping of goods from Internet merchants to AVPP users as follows. Each virtual user's fictional shipping address may include a shipping code identifying the virtual user as a member of the AVPP system. Before shipping the goods, the third party shipper may obtain the real user's shipping address from an organ of the AVPP directly, by providing the shipping code, whereby the real user address is not communicated over the Internet. The shipping organization receives the goods to be shipped from a dispatch site of the Internet merchant and delivers the goods to the real user. In some embodiments, the virtual users' fictional mailing address may include an indication of a geographical vicinity of the real user address, so that the Internet merchant may be able to efficiently allocate a proper dispatch site for the goods, to minimize shipping time and costs, yet without having access to the complete address of the user.

As described above, payments by a virtual personality over the Internet may be in the form of virtual credit/debit cards registered to the virtual personality. This may be implemented using a real credit card number that may be issued to the AVPP by an existing credit card company. The AVPP may be directly responsible for the payment of its virtual users' credit card bills. For billing and credit card authentication purposes, each virtual credit card of an AVPP user may be registered with the address of the AVPP and the fictional identification information assigned to each user. Payment made by the AVPP on behalf of its users may be deducted from the corresponding real users' transaction accounts within the AVPP, and payments received by the AVPP on behalf of its users may be added to the corresponding real users' transaction accounts.

In some embodiments of the invention, the AVPP may create its own line of virtual products, which may be offered to the AVPP users. In one embodiment, the AVPP may create a series of exclusive, e.g., copyrighted and/or trademarked, virtual personalities, having predefined attributes, preferably including an audio-visual representation, that may be purchased by the AVPP users. A buyer of such a predefined virtual personality may become the legal owner of the intellectual property rights to the virtual personality, and may use it on the Internet to engage in any of the Internet activities described above, for example, using a virtual transaction account. Additionally or alternatively, each AVPP user may be able to construct a customized virtual entity, using tools provided by the AVPP.

In some preferred embodiments of the invention, the AVPP may function as a portal between the real world and the virtual world, and certain elements of the AVPP system described above may follow the users during Internet activity outside the AVPP website. For example, the AVPP may include tools as are known in the art to assist users in constructing personalized virtual home pages, which may serve as "homes" for the virtual entities and may host representations of other real and virtual entities. Further, a user may be able to surf the Internet using Web browsing software that has been modified to include features of the AVPP. Additionally or alternatively, the AVPP may provide Internet access to its users. The AVPP may also provide services such as a Web browser using state-of-the-art search engines. An AVPP in accordance with the invention, which also provides the user's internet access services, may be able to protect the identities of its users even more comprehensively, for example, by randomizing the Internet Protocol ("IP") addresses of its users and by implementing anti-spamming and/or anti-targeting and/or proxy-server solutions as are known in the art.

There is thus provided, in accordance with a preferred embodiment of the invention, a method of enabling a real entity to access a service on a communication network using a virtual entity, the method including the steps of establishing a user account including at least first data corresponding to the identity of the real entity and second data corresponding to the virtual entity and not identifying the real entity, storing the first and second data in a first database, linking between the first and second data in the first database, storing the second data at a second database, associating the second database with a communication network site, connecting the communication network site to the communication network, receiving the second data from an unidentified user on the communication network site, identifying the unidentified user as the virtual entity based on receiving the second data, and allowing the virtual entity to access the service.

Further, in accordance with a preferred embodiment of invention, there is provided a virtual entity residing on a communication network site and adapted to interact on a communication network on behalf of a real entity, the virtual entity including a memory having stored therein information defining the virtual entity, which information includes a unique user name, a password and information corresponding to a visual representation of the virtual entity, and a virtual user interface adapted to communicate with the communication network from the communication network site, wherein the virtual entity is not linkable, on said communication network, to the identity of the real entity.

BRIEF DESCRIPTION OF THE DRAWINGS

The invention will be understood and appreciated more fully from the following detailed description of preferred embodiments of the invention taken in conjunction with the accompanying drawings in which.

DETAILED DESCRIPTION OF PREFERRED EMBODIMENTS

The AVPP in accordance with the invention implements fundamental and revered separation between a user's real identity and the user's Internet identity (i.e., the virtual personality), whereby no information linked to the real identity ever need be communicated via the Internet. According to this concept, the AVPP preferably consists of two separate sub-systems, namely, a virtual world system and a real world system. The two sub-systems do not communicate with each other via conventional Internet connections. This concept is depicted in FIG. 1, which schematically illustrates an overview of an AVPP system in accordance with an embodiment of the present invention, operating in conjunction with a world wide computer communication system 12, such as the Internet, also referred to herein as the "Web".

Figure 1:
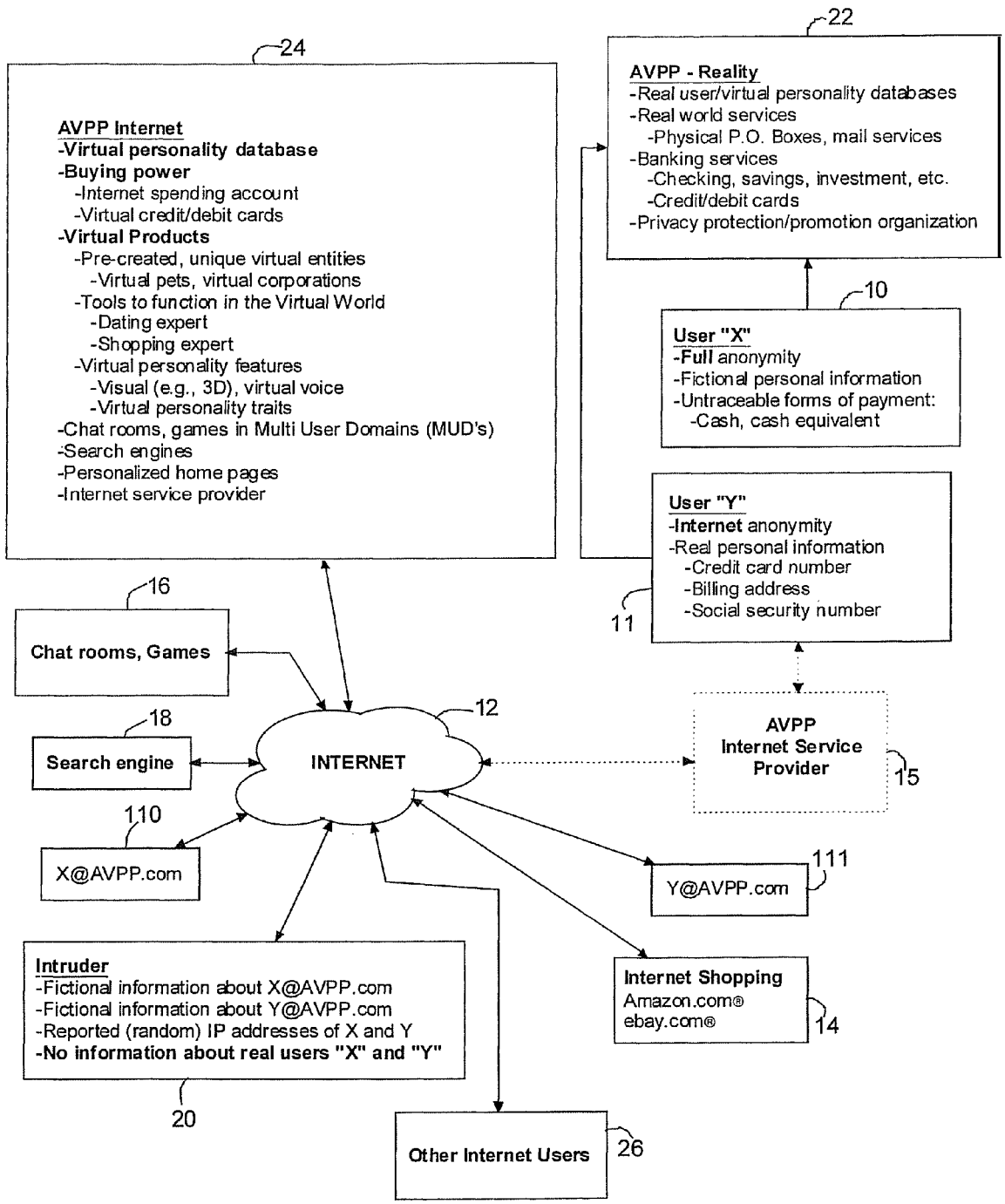
FIG. 1 is a schematic block diagram illustrating an overview of an Anonymous Virtual Personality Provider (AVPP) system in accordance with an embodiment of the present invention, operating over a global computer communication network.

The system of FIG. 1 includes an AVPP real world site 22 and an AVPP Internet site. The AVPP real world site communicates with real user 10 (also referred to herein as user type "X"), who is a completely anonymous user, and with a real user 11 (also referred to herein as user type "Y"), who is anonymous vis-à-vis Internet 12 but is known to the AVPP real world site 22, as described in detail below. The AVPP Internet site 24 is connected to the Internet 12 using means as are known in the art, and preferably includes an Internet server and a virtual user interface, as described below.

In accordance with an embodiment of the invention, as described in detail below, users 10 and 11 may access Internet 12 using virtual personalities 110 and 111 which are assigned to users 10 and 11, respectively, to engage in various activities. For example, users 10 and 11 may purchase goods from a website of an electronic retailer ("e-tailer") 14, participate in chat rooms or games 16, surf the Web using a search engine 18, as is known in the art, or interact with other Internet users 26. In accordance with the invention, virtual users 10 and 11 may be exposed during their Internet activity to an intruder 20, defined broadly herein as an entity that may collect and use information about users 10 or 11 for purposes not authorized by users 10 and 11, such as for consumer targeting or for any other purpose that may be considered an invasion of the privacy of users 10 and 11.

In a preferred embodiment of the invention, the identity of real user 10 is not disclosed to AVPP real world site 22, and cash or other untraceable forms of payment, such as a money order or a negotiable bank note, collectively referred to herein as "cash equivalent", are the only means of communication between real user 10 and the AVPP. According to this embodiment, payments by real user 10 to the AVPP real world site 22 are made in cash or cash-equivalent at pre-designated payment sites, e.g., Internet cafes, convenience stores, vending machines, etc., and in exchange for such payment the user may receive a quota of Internet buying power in the form of a prepaid transaction account issued by the AVPP real world site, as described in detail below. The pre-paid transaction account may be identified by an identification code, which may include a sequence of numerals and/or symbols physically printed on the face of a card, or a code which is magnetically, electronically or optically recorded on the card. The identification code of the pre-paid transaction account may be attached to the virtual entity 110 subsequently assigned to or created by real user 10 for Internet activity, as described below. Once user 10 has been authenticated at a website of the AVPP, such as at the AVPP Internet site 24, user 10 may further edit and expand the content of the virtual entity 100, as described below, and edited and/or expanded information of virtual user 110 may be subsequently used to authenticate user 10. Pre-paid transaction accounts may be issued by the AVPP real world site 22 in various denominations, such as 20 U.S. Dollars, 50 U.S. Dollars and 100 U.S. Dollars, or any other denomination suitable for Internet spending. Additionally or alternatively, the AVPP real world site 22 may assign the pre-paid account a fictional user name and fictional user information, which information may be used to authenticate transactions of user 10 on the Internet using the pre-paid transaction account, as described below. This embodiment of the invention may be useful for extremely privacy-oriented users who are reluctant to disclose their real identity to anyone related to the Internet, including the AVPP.

In contrast to real user 10, the identity of real user 11 is disclosed to the AVPP real world site 22, or to organs of AVPP real world site 22, as described below. The identity may be disclosed using conventional methods, for example, in person, by mail, by phone, by direct connection though a telephone line, or even through a secure connection over the Internet, such as a secure socket layer ("SSL") connection, as is known in the art, depending on the level of comfort of the user in using any of those conventional methods. The AVPP real world site 22 may then provide user 11 with a virtual user name and virtual user information, which may include an identification code and other information, which may be later used over the Internet to authenticate the transactions of user 11. This information may be attached to the virtual user 111 created by or assigned to user 11. Once real user 11 has been authenticated at an Internet site of the AVPP, such as AVPP Internet site 24, which site may be accessed via the Internet using conventional Internet access tools, real user 11 may edit and/or expand the content of the virtual user 111 and/or add more information related to virtual user 111, which additional or edited information may subsequently used to authenticate user 11. In this constellation, the crucial linking between the identity of real user 11 and the virtual user 111 is known only to the user and to the AVPP real world site 22, i.e., off the Internet. The AVPP Internet site 24 communicates only with the virtual user and does not store any information that may be traced back to the real user. In this manner, the real information relating to user 11 is prevented from being compromised to any other entities on the Internet, even if security mechanisms of the AVPP Internet site 24 fail. This is fundamentally different from prior art systems in which user information is secured from the Internet only by electronic means, such as encryption and communication through secure servers. In the present system, real information about real user 11 is stored only in an internal database of the AVPP real world site 22, and is not communicated even to the AVPP Internet site 24. All communication between the AVPP real world site 22 and the AVPP Internet site 24, relating to the activity of real user 11, is based solely on the information included in the virtual entity 111. As explained below, the AVPP real world site and the AVPP Internet site may not be separated physically, for example, they may be located on separate servers of the same system, as long as the linking between real user 11 and virtual user 111 is stored separately and is prevented from being communicated over the Internet.

It is appreciated, however, that the identity of user 11 may not be completely "sealed" from the Internet, in the sense that a person within the AVPP real world site organization may intentionally, or by an act of negligence, compromise a user's identity and communicate such identity over Internet. However, a user who is concerned about privacy to such an extent, that the user is reluctant to rely on the integrity of the AVPP system personnel, has the alternative option of subscribing to the AVPP system with total anonymity, using the model described above with reference to real user 10.

Once an account has been created at the AVPP real world site 22, for each of real users 10 and 11, and information or a code corresponding to virtual users 110 and 111 has been communicated to the AVPP Internet site 24, using the method and system described above or any other suitable implementation for a separation between virtual users real users, the virtual users 110 and 111 are provided with a variety of optional tools, as may be required by a virtual entity in the context of the invention. For example, each of virtual entities 100 and 111 may be provided with a transaction tool, which may be in the form of a virtual credit or debit card number registered under the identity of the virtual entity, as described below. The transaction tool enables virtual users 110 and 111 to perform transactions over the Internet, for example to subscribe to an fee-based Internet services, or to purchase products over the Internet, e.g., at the e-tailer site 14, without disclosing their true identity. Using the transaction tool, virtual entities 110 and 111 may also receive payments, for example, refunds from e-tailer 14 for returned or damaged goods. The AVPP real world site 22 may include an accounting system for issuing and billing virtual debit or credit accounts, and tracking payments credited to virtual users 110 and 111 and payments made by virtual users 100 and 111. Each virtual user account may have a spending limit, which may be based on the amount of money purchased using pre-paid transaction accounts, in the case of totally anonymous user 10, or based on a credit rating, in the case of user 11 whose identity is known to the AVPP real world site 22. The linking between the real identity of real user 11 and the corresponding virtual entity 111, for both debit and credit purposes, is accessible only within the internal accounting system of the AVPP, thereby fully protecting this crucial linking from being communicated over the Internet.

To secure the financial interests of the AVPP and its users, against Internet security breaches such as credit card theft, the AVPP system may incorporate information security solutions as are known in the art. Thus, the AVPP of the present invention does not obviate the need to physically secure the transfer of information on the Internet. However, the AVPP system and method protect user privacy on the Internet by creating a fundamental and revered separation between the virtual personalities and their corresponding real life identities, whereby real user identities are not compromised even when Internet security fails. This added value is expected to become increasingly important as the Internet grows in size and sophistication.

As described above, users 10 and 11 are provided with virtual transaction accounts linked to virtual entities 110 and 111, respectively, and the transaction accounts are backed by real funds or credit accounts of users 10 and 11 within the AVPP real world site 22. Thus, the AVPP system may provide its users with anonymous buying power, which may be pre-paid or backed by a credible billing system. Using its accounting system, the AVPP real world site 22 may deduct a predetermined percentage from the funds made available to virtual entity 110 and 111, as a commission for the services of the AVPP. Such deduction to the AVPP may be performed using methods known in the art. In some embodiments of the invention, the commissions paid by the users may be offset by equal, or even larger, savings to the users in subsequent Internet transactions, for example, if the AVPP contracts with various service providers and merchants on the Internet to lower prices, in view of the large number of anonymous users operating under the AVPP system. Additionally or alternatively, the AVPP may charge each user a periodic fee for handling each anonymous Internet account, which fee may be used to cover the cost of credit-card fraud and other liabilities and to support additional services that the AVPP may offer its users. This fee may also be deducted from the accounts of users 10 and 11 within the AVPP accounting system.

Most transactions on the Internet do not inherently require identification of the real entity making the transaction, such as the entity's mailing address. For example, "soft products", such as downloading software, music or video, "print-your-own" products, such as uniquely bar-coded stamps or movie tickets, etc., or even hotel reservations. Such products do not require additional treatment by the AVPP once the anonymous payment method described above is implemented. However, in preferred embodiments, the AVPP also accommodates transactions that inherently require a mailing address, for example, purchasing products that may be shipped to the customer. To accommodate such transactions, the AVPP real world site 22 may establish physical mailboxes that are assigned to subscribers, under their virtual identity, and may be accessed at locations affiliated with the AVPP real world site 22. This solution may be suitable for users, such as user 10, who seek full anonymity, i.e., who communicate with the AVPP only via transfer of cash or cash equivalent.

An alternative embodiment is suitable for users whose mailing addresses are disclosed to an organ of the AVPP, such as real user 11, whose mailing addresses are disclosed as part of the information needed to establish a transaction account. For those users, the AVPP real world site may include its own shippihg division, which may be part of the real world subsystem of the AVPP, or the AVPP may contract with a trusted third party shipping organization, such as FedEx®, to handle the shipping of goods from Internet merchants to real users as follows. The fictional address of the virtual user 111 may include a shipping code identifying the virtual user 111 as a member of the AVPP system. This shipping code may then be used to retrieve the real shipping address of user 11 from the AVPP real world site, before the shipping order is executed, for example, through direct communication between the shipping organization and the AVPP real world site 22, whereby the real user address is not communicated over the Internet. The shipping organization receives the goods to be shipped from a dispatch site of the Internet merchant and delivers the goods to the real user 11. In some embodiments, the virtual user's fictional mailing address may include the real zip code or some other indication of the geographical vicinity of the real user 11, so that the Internet merchant may be able to efficiently allocate a proper collection site for the goods, to minimize shipping time and costs, but without having access to the complete address of the user 11. This type of shipping solution is described below in conjunction with an exemplary embodiment of the invention.

As described above, payments over the Internet by a virtual entity, such as virtual entities 110 and 111, may be in the form of a virtual credit/debit cards registered to the virtual personality 111. This may be implemented using a real credit card number that may be issued to the AVPP by an existing credit card company, such as Visa®. The AVPP may be directly responsible for the payment of the credit card bills of virtual user 111. For billing and credit card authentication purposes, each virtual credit or debit card issued to a user of AVPP system may be registered at the credit card company with the address of the AVPP and the fictional identification information assigned to each user. Payments made by the AVPP on behalf of its users may be deducted from the corresponding real users' transaction accounts within the AVPP system, and payments received by the AVPP on behalf of its users may be added to the corresponding real users' transaction accounts. Thus, for real user 11, who does not require full anonymity, the billing system is relatively simple in structure and may be transparent to the real user 11 operating under entity 111.

In some preferred embodiments of the invention, the AVPP may create virtual entities and virtual products that may be offered to the AVPP users. In one embodiment, the AVPP may create a series of exclusive, e.g., copyrightable and/or trademarkable copyrightable and/or trademarkable, virtual personalities, having predefined attributes, that may be purchased by users 10 and 11, to replace or to be used in addition to virtual entities 110 and 111, respectively. A buyer of such a predefined virtual personality may become the legal owner of the intellectual property rights to the virtual personality, and may use it on the Internet to engage in any of the activities available to virtual personalities, for example, the predefined virtual entity may be attached by the user to an existing virtual transaction account with the AVPP or the purchased virtual entity may be assigned a separate transaction account. Additionally or alternatively, each AVPP user may be able to construct a customized virtual entity, using tools provided by the AVPP. For example, the user may construct an image and/or a voice of the virtual entity, by selecting among a variety of choices made available on the AVPP website, which choices may include a selection of body parts that may be combined into a unique image representing the virtual entity. The virtual personalities created or acquired by users 110 and 111 may be the equivalent of any real world entities, such as people, animals (e.g., pets), or corporations. The customized virtual entities may be used to surf the Internet, and to interact with other real and/or virtual entities on the Internet, being limited only by their imagination. However, to aid the process of establishing a solid virtual personality, the AVPP may provide services to assist people in materializing their Internet dreams. Such services may include an online dating expert, an online business expert, an online service for automatic translation of the language used by savvy Internet users ("e-language"), and any other tools that may improve the Internet-related skills of the virtual personalities.

In some preferred embodiments of the invention, the AVPP may function as a portal between the real world and the virtual world, and elements of the AVPP system described above may follow the users during their Internet activity outside the AVPP website. Additionally or alternatively, the AVPP may include or contract with an Internet Service Provider ("ISP") 15 to provide Internet access to its users, such as user 11. Since subscribing to an ISP requires a real user's identity to be disclosed to the ISP, users of type "X", such as user 10, may prefer not to subscribe with any ISP. The AVPP may also provide services such as a Web browser using state-of-the-art search engines with anonymous browsing capabilities, as are known in the art, for example, a proxy-server type arrangement of the type operated by Anonymizer.com®. An AVPP in accordance with the invention, which also includes an ISP, may be able to protect the identities of its users even more comprehensively, for example, by randomizing the Internet Protocol ("IP") addresses of its users and by implementing anti-spamming and/or anti-targeting and/or proxy-server type solutions, as are known in the art.

Figure 2:
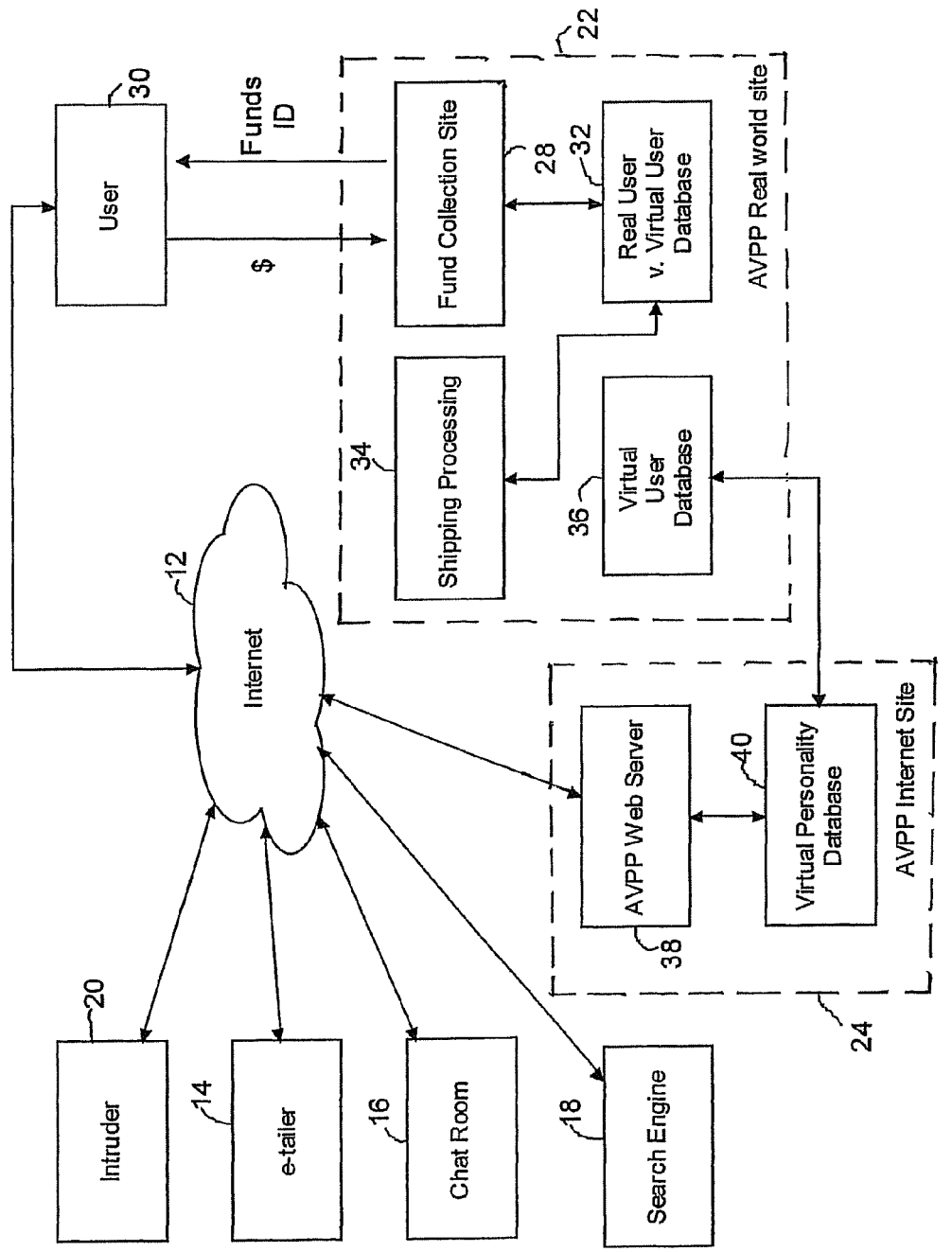
FIG. 2 is a schematic block diagram illustrating the flow of funds through an AVPP system in accordance with an embodiment of the invention, operating over a global computer communication network.

FIG. 2 schematically illustrates the flow of information and funds in an AVPP system according to an embodiment of the present invention. While FIG. 2 depicts one embodiment of a system which may perform the method of the present invention, other systems and arrangements of components may be used to perform such a method, and the system of the present invention may incorporate other systems and/or perform modified methods. The AVPP system of FIG. 2 includes the AVPP real world site 22 and the AVPP Internet site 24. The AVPP real world site includes a fund collection site 28, a shipping processing division 34, a real user versus virtual user information database ("RU/VU") 32 and a virtual user information database 36, all of which elements are discussed in more detail below. Both the shipping processing division 34 and the funds collection site 28 may communicate with the RU/VU database 32, to retrieve certain information therefrom and to supply other information thereto. As explained below, the shipping processing division operate or be associated with a shipping company, such as FedEx.RTM., to provide the shipping company with shipping address information upon a specific request. Such request may include a code identifying a virtual user of the AVPP, and/or a virtual shipping address of the virtual user, which information may be linked to a corresponding real user shipping address within RU/VU database, as explained below. Thus, upon a specific request from the shipping company, the shipping retrieves a real user shipping address from the RU/VU database 32 corresponding to the virtual user information or other code included in the request. This mechanism enables shipping of goods to the real user without communicating the real user shipping address over the Internet, as demonstrated by examples below.

When a real user 30 wishes to connect to the Internet 12, the user may also be connected, voluntarily or involuntarily, to various Internet sites, such as e-tailer 14, chat room 16, search engine 18 and Internet Intruder 20, hereinafter collectively referred to as Internet sites, all of which sites are described above with reference to FIG. 1. Real user 30 may be a completely anonymous user, according to the model described above with reference to real user 10 of FIG. 1, or a user who is anonymous only vis-à-vis the Internet, according to the model described above with reference to user 11 of FIG. 1. By being connected with the Internet sites, user 30 may perform tasks such as "surfing the web," using search engine 18, making purchases from E-tailers such as the E-tailer 14, or participating in chat room 16. Internet sites 14-18 provide Internet related services and are connected to the Internet 12 through known methods, and may include any functions and structures as are known in the art.

The real user 30 may wish to engage in such activities in an anonymous fashion. The user transmits funds, e.g., U.S. dollars, to the funds collection site 28, which may be any organization collecting funds on behalf of another party, such as a bank, newsstand, Internet cafe, or any other organization, or maybe part of the AVPP real world site 22, as described above with reference to FIG. 1. The user may physically travel to the funds collection site or may perform the transaction in any other manner, such as via the telephone, by mail, or by connecting to a computer of the collection site via direct communication means such as a telephone line. In some embodiment of the invention, the user may connect to the funds collection site over the Internet using a secure communication means, such as a secure socket layer (SSL) connection, as is known in the art. In exchange for the transfer of said funds, user 10 may receive a funds identification code, also referred to herein as "funds ID", which defines a virtual transaction account assigned to user 30, as described above with reference to FIG. 1.

The funds identification code, may be used by user 30 to access AVPP Internet site 24, which may include an organization and/or a collection of computer hardware and/or software enabling anonymous use of services provided over the Internet, such as purchasing products or services, participating in social activities such as chat groups, or searching the World Wide Web ("Web") using a search engine, or any other activities as are known in the art. Preferably, the AVPP Real world site 22 and the AVPP Internet site 24 are physically and, in some embodiments, organizationally distinct entities, as described above with reference to FIG. 1. The AVPP real world site 22 may connect directly with a user to perform functions that require knowledge of the true identity of the user, such as account set up and maintenance. The AVPP Internet site interacts with the user via the Internet to perform functions requiring anonymity, such as surfing, purchasing goods, research, participating in chat rooms, etc., as described above with reference to FIG. 1.

Figure 3:
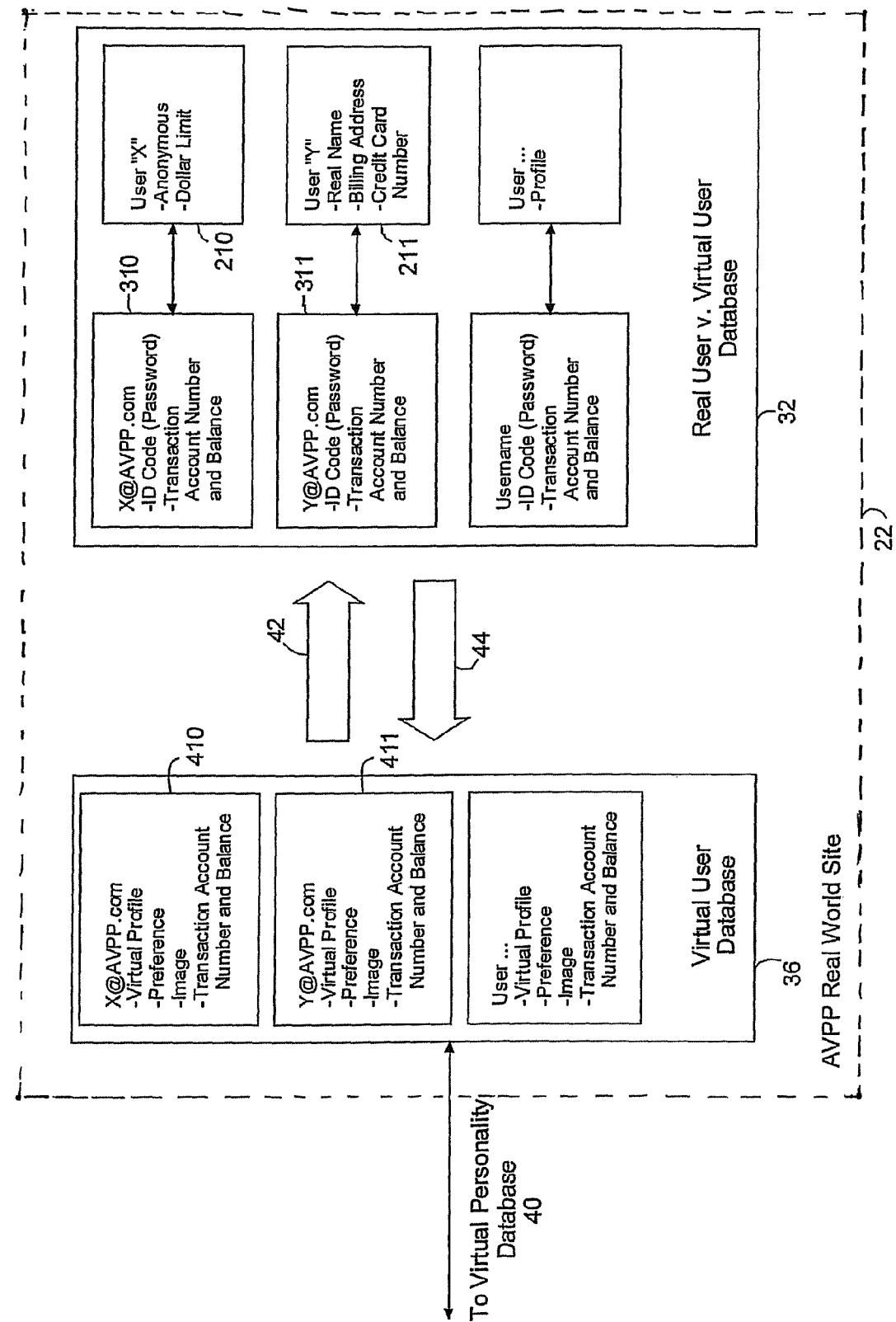
FIG. 3 is a schematic block diagram illustrating part of an AVPP real world site of an AVPP system according to FIG. 1 or 2.

Reference is now made also to FIG. 3, which schematically illustrates part of the AVPP real world site of FIG. 2 in more detail. In an exemplary embodiment, the AVPP real world site 22 includes the RU/VU database 32 and the virtual user information database 36, and the AVPP Internet site includes a virtual personality database 40 and a Web server 38. For each user, such as user 30, there exists a real user entry in RU/VU 32 linked to a corresponding virtual entity entry in RU/VU 32. For example, real user 10 (FIG. 1) has a real user entry 210 and a corresponding virtual user entry 310, and real user 11 (FIG. 1) has a real user entry 211 and a corresponding virtual user entry 311. Preferably, the real user entry 211 includes identifying information of user 11, such as first and last name, shipping and billing addresses, real credit card number, and/or any other information that may be necessary in order to process payments from and/or transfer funds to user 11. In contrast, the real user entry 210 does not include any identifying information about user 10, as this information is not available from user 10 who purchased a transaction account for cash or cash equivalent. Instead, the real user entry 210 may include only the amount of money user has remaining in the transaction account purchased, as well as the funds ID mentioned above.

The virtual user entries 310 and 311 preferably include virtual profiles of users 10 and 11, respectively, as well as the funds ID code of each user, or any information that may be required in order to authenticate the Internet transactions and other activities of users 10 and 11 on the Internet. This information is not related to the identity of users 10 and 11 and, in some embodiments of the invention, this information may be altered periodically by the AVPP system to avoid fraud. Each virtual user entry preferably also includes a virtual transaction account number and an account balance, e.g., in U.S. Dollars, for the purpose of processing the virtual transaction accounts of the users, as described above with reference to FIG. 1. The virtual information may also include a virtual e-mail address, and a virtual user access ID ("username") and virtual user password. The virtual user profiles may further include information that may be added by the users 10 and 11 at the AVPP Internet site 24 to reflect the personalities each user wishes to present on the Internet, for the purpose of their activity as virtual users 110 and 111, respectively. For example, a virtual entry may include imaginary personality characteristics, physical characteristics, an imaginary profession and preferences, etc., as described below with reference to virtual personality database 40 of FIG. 4. However, any such additional information that is not required for the process of authenticating the transactions of virtual users 110 and 11 may be omitted from the virtual user entries. Such additional information may still be included in the virtual personality profiles of users 110 and 111 in the virtual personality database 40, as described below. Each real user entry in the RU/VU database 32 is preferably linked to a corresponding virtual user entry, for example, entry 210 is preferably linked to entry 310 and entry 211 is linked preferably to entry 311, using a reference or pointer as is known in the art. This linking is the crucial linking between real users and virtual users that the present invention seeks to protect from undesired disclosure over the Internet.

The virtual user entries, for example, entries 310 and 311, are preferably also included, in whole or in part, in the virtual user database 36, and stored as virtual user entries 410 and 411, respectively. The virtual user site 36 may function essentially as a "privacy buffer" between the AVPP real world site 2 and the AVPP Internet site 24, and assists in preventing access from the Internet to real user information even when the security of AVPP Internet site 24 is compromised, as explained in detail below. Virtual user entries 410 and 411 may be generally identical to virtual user entries 210 and 211, respectively; however, at a given point in time, database 32 may not be fully updated with changes in database 32, and vice versa. This is because databases 32 and 36 are separate and distinct and may be periodically updated to reflect changes in either or both database only according to a special update protocol, as described in detail below. Further, since some of the imaginary information in the virtual user profiles is not required for authentication purposes, certain types of information may be included only in database 32 or only in database 36, depending on the specific system design.

In a preferred embodiment of the invention, the RU/VU database 32 and the virtual user database 36 are electronically separated and distinct and may communicate with each other only though use of a special safe linking protocol that enables mutual updating of the two databases through safe update links 42 and 44. In a preferred embodiment of the invention, updating through links 42 and 44 may be performed only when the connection between virtual user database 36 and a virtual personality database 40 at the AVPP Internet site (FIG. 2) is temporarily halted for a period of time required by the periodic update. This may be achieved by using electronic switching mechanisms as are know in the art switch the connection between database 36 and database 40 "off" before switching "on" the updates through links 42 and 44. Once an update is complete, the connection between database 36 and database 40 may be reinstated. The optimal time between updates and the time required for each update may be determined based on the specific system requirements and system traffic. For example, the update time may depend on the amount of new information normally transferred during an update, and may increase if the time between updates is increased. The time between updates may depend on business requirements, such as a reasonable time that user 30 should wait after transferring funds to the funds collection site 28 until a new balance is available on the user's virtual transaction account at the AVPP Internet site 24.

It should be appreciated that the update protocol described above, and the use of switching mechanisms, is given as an example only to demonstrate a fundamental separation between the AVPP Internet site and the sensitive linking between real users and virtual entities at the AVPP real world site. However, any other means known in the art for separating information databases may be equally, or even more suitable, for the purpose of separating between RU/VU database 32 and virtual user database 36.

It should be noted that any reference above or below to the separation between AVPP real world site 22 and AVPP Internet site 24 should be understood to mean separation between organs of the AVPP system at which real user information may be stored and organs of the AVPP system that may communicate with the Internet and should, therefore, not have online access to real user information. The physical location of each element of the AVPP system is not significant. For example, in some embodiments of the invention, the virtual user database may be omitted and other arrangements may be made to safely update information between RU/VU 32 and virtual personality database 40 of AVPP Internet, such as applying the above described switching mechanisms to allow communication between databases 40 and 36 only when communication between database 40 and AVPP Web server 38 is halted.

Figure 4:
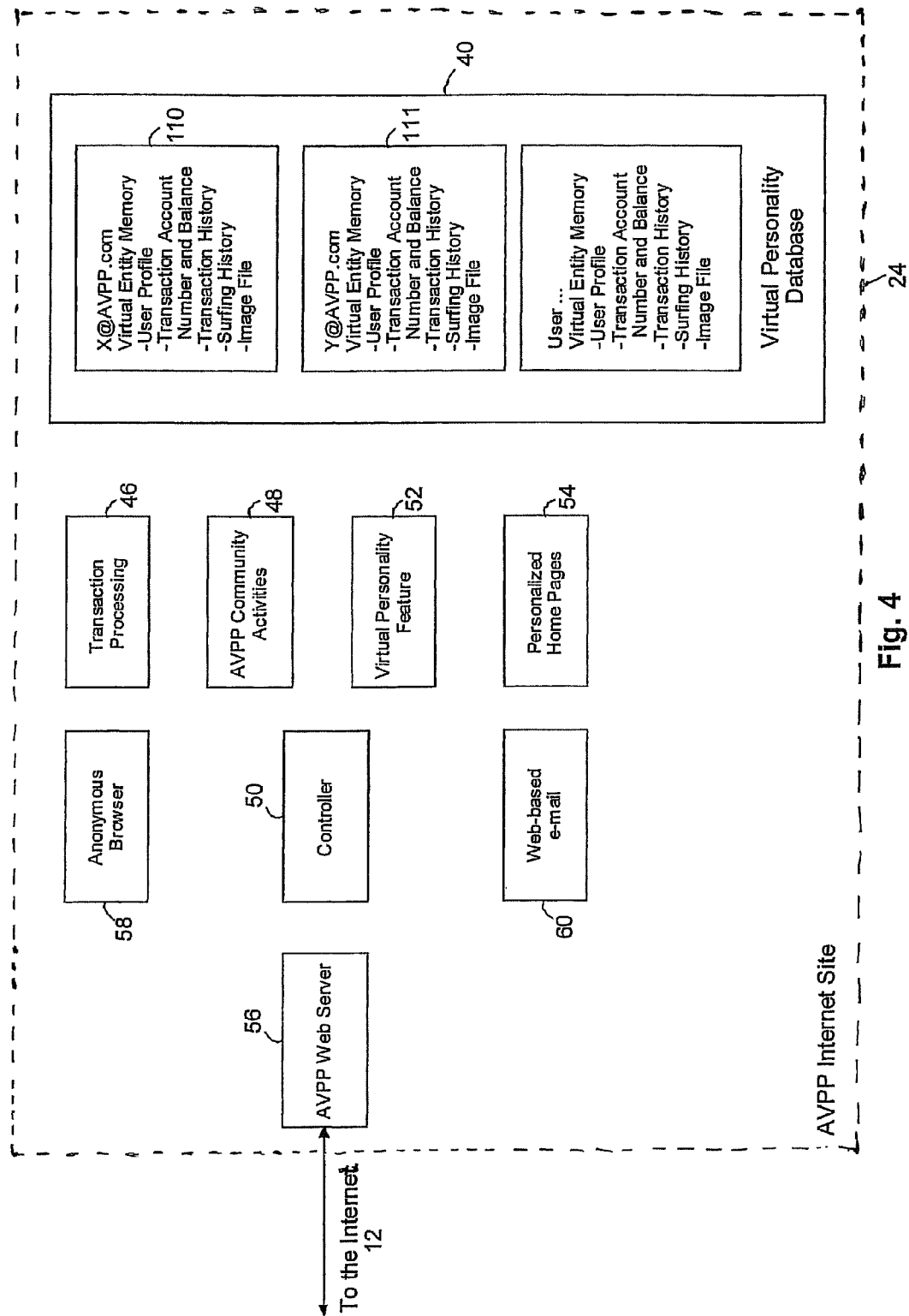
FIG. 4 is a schematic block diagram illustrating an AVPP Internet site of an AVPP system according to FIG. 1 or 2.

Reference is now also made to FIG. 4, which schematically illustrates the AVPP Internet site in more detail. For each user, such as users 10 and 11, a virtual entity entry exists in the virtual personality database, such as virtual entity 110 and virtual entity 111, respectively. Each virtual entity profile preferably includes the virtual transaction account information described above, and the account balance. Each virtual transaction account is preferably linked to a real credit card or debit card number, issued to the AVPP by an established credit card company, e.g., Visa® or American Express It should be appreciated that a virtual transaction account number (or "virtual transaction ID") need not be a credit card number, and may be of a different form, such as a debit card number or any identification corresponding to a user's real or virtual identity allowing funds to be transferred between the AVPP and another entity, such as e-tailer 14 or the party issuing credit to the AVPP organization, such as a credit card company or a bank.

As mentioned above, in an exemplary embodiment, the AVPP Internet site includes virtual personality database 40. Preferably, the virtual personality database stored at the AVPP Internet site mirrors the virtual information database 36 stored at the AVPP reality site, and the two databases are continuously updated with changes in either database. To access a virtual user account at AVPP Internet site, a real user may use the virtual user access ID and virtual user password stored in the virtual personality database 40. Then, using the virtual entity stored in the virtual personality database 40, the user may anonymously access the Internet and anonymously interact with Internet entities, such as Internet sites 14-18, without being concerned about revealing real user information to third parties, such as intruder 20, simply because the virtual user profile used does not include any information that may be linked to the real user. For example, users 10 and 11 may use the virtual entities 110 and 111, respectively, to interact with e-tailer 14, other users 26, Web browser 18, or chat room 16. If intruder 20 seeks to collect information about users 110 and 111, the information available to intruder 201's only that which is stored in virtual entities 110 and 111, and so the privacy of users 10 and 11 is protected. Even if the virtual transaction accounts of users 110 and 111 are compromised to intruder 20, for example, in case of security failure at AVPP Internet site 24, the real identities of real users 10 and 11 are still protected.

The AVPP Internet site 24 preferably includes an e-mail server, preferably a Web-based email server 60, as is known in the art, which receives and sends e-mails for e-mail accounts corresponding to the virtual e-mail addresses included in the virtual entities stored in database 40, such as virtual entities 110 and 111. The AVPP Internet site preferably also includes software 46 for processing the anonymous transaction of the virtual user accounts, as described in detail above. The AVPP Internet site may include modules providing other functionality to users, such as an anonymous browser 58, chat rooms or "community activity rooms" 48 designed specifically for virtual personalities, tools for building customizable home pages 54, and/or tools for editing the virtual personality 52. Most of these functionalities are describes above and below, in various contexts, and may be implemented using software and/or hardware solutions known in the art, or may be developed using software development tools known in the art.

The virtual personality editing tool 52 may include software to enable users to create visual representations of their virtual entities, in two or three dimensions, and to store such images as part of the virtual user profile, whereby each user may create a unique image to represent the virtual entity on the AVPP website or, possibly, on other websites that may be equipped with software tools for displaying such images. In some embodiments, the virtual entities may also include information corresponding to a desired voice pattern of the virtual entity, and this voice may be used for interaction with other Internet entities, whereby one real user may be able to view the virtual entity of another real user and listen to its voice. Software tools for converting typing of words on a personal computer to audible speech from a virtual character are known in the art, and such tool may be incorporated in to the AVPP system of the present invention. The personalized home pages 54 may be useful for users who wish to host other real or virtual Internet entities in a personalized environment. In a preferred embodiment of the invention, each virtual entity may be able to interact with other virtual entities at the AVPP Internet site 24, or at personalized environments or, depending on Internet standardization, even on websites not related to the AVPP system. In such interaction, one virtual entity may transfer information from its virtual profile to another virtual entity, and vice versa, for example, using a "file transfer" tool as is known in the art. In this manner, virtual personalities may share or exchange information in the virtual world, and may get to "know" one another. Such interactions are even more meaningful when they are accompanied by a memory function. It should be appreciated that once a virtual entity in accordance with the invention is created, such virtual entity interacts on the Internet exactly like a real user and, therefore, there are essentially no limits to the type and scope of interaction available to virtual entities on the Internet.

In a preferred embodiment of the invention, as shown in FIG. 4, each virtual entity may have a personal virtual memory, which may be part of the virtual personality entry in virtual personality database 40, for example, virtual entity 110 or 111. This memory enables virtual entities 110 and 111 to memorize various interactions for the benefit of users 10 and 11, respectively. For example, each virtual entity may include records of the entity's surfing history, its spending history, the content of conversations with other virtual entities and real users, and/or any other information that may be useful for future interaction of the virtual entity on behalf of the real user. Collection of such information by the virtual entity on behalf of the real user is particularly helpful to users who resent the practice of Internet sites collecting information about their surfing and shopping habits. Such users typically choose to disable "cookies" from being implanted on their personal computer and employ other means to protect themselves from being targeted by service providers and merchants on the Internet. As explained above, the AVPP Internet site preferably includes additional means to protect users from such targeting. For example, anonymous browser 58 may include a proxy-serve type system or any other system or method known in the art for concealing the IP address of the real users. However, a user disabling "cookies" or otherwise concealing the identity of the computer from which the user is communication may have the disadvantage of not keeping track of past activities, whereas users who allow cookies have the advantage of being reminded of past activity whenever they visit the websites using the "cookies". Therefore, having a virtual entity in accordance with the present invention that "remembers" the activity of the real user on the Internet, as described above, enables the users to enjoy both worlds, namely, to keep records of the user's activity on the Internet without disclosing the user's surfing and shopping habits to undesired destinations.

Referring briefly to FIG. 2, as described above, user 30 may connect via Internet 12 to AVPP Internet site 24 and, via AVPP Internet site 24, to Internet sites 14-18. User 30 is preferably connected to the Internet 12 through a user terminal, which, in an exemplary embodiment, is a personal computer of known construction. Such a user terminal preferably includes a modem or other equipment for establishing and maintaining a connection to an ISP, for connecting the user to the Internet 12, and for allowing the transfer of data from and to the user's computer. The personal computer is preferably associated with a monitor or other display device. A user software module, such as an Internet browser (e.g., the Netscape® Navigator), operates the user terminal, and operates a user interface during a remote session with an entity such as one of Internet sites 14-18, or with the AVPP Internet site 24. The user terminal may include augmentation modules such as cookies, Java applets, or plug-ins; however, in a preferred embodiment of the invention, the AVPP system may disable some or all of those modules to enhance privacy, as discussed above. Internet sites 14-18 typically use client/server software to provide a variety of services and functions. Preferably, each Internet site 12-18 includes a server module including software and equipment to provide a user interface to the user software module and to accept user input from the user software module. In alternate embodiments, the equipment, terminals or software used by user 30 to access the AVPP Internet site 24, or Internet sites 14-18, may be of other configurations.

Referring again to FIG. 4, the AVPP Internet site 24 site includes a Web server 56, generating a Web based user interface, as described below, and a controller 50 which controls the overall operation of AVPP Internet site 24, including the transfer of information into and out of the virtual entities in virtual personality database 40, and including the transactions processing system 46 described above. In an exemplary embodiment, the Web server 56 and controller 50 may be implemented using units including Intel™ processors. The Web server 56 may include, for example, software implementing Web server functionality and operating on the Linux operating system, and controller 50 may operate on the Linux operating system. In an exemplary embodiment, the virtual personality database 40 includes a Unix server on which an Oracle™ database may operate. Preferably, the controller 50 is associated with the transaction processing system 46, storing billing and contact information for the virtual users, such as virtual users 110 and 111. The transaction processing system 46 may generate billing information, transmit bills, record account information, and provide other client or partner related services.

The AVPP Internet site 24 may connect to the Internet 12 via known methods, such as via redundant Cisco™ switches and Cisco™ routers connected to DS3 lines. Known security systems may be used, including equipment such as firewalls.

In alternate embodiments, the various functions performed by the AVPP real world site 22 and the AVPP Internet site 24 may be implemented using different equipment and software, may be combined into different functional units, and may omit certain functionality or include additional functionality, without departing from the spirit and scope of the invention. For example, the AVPP real world site 22 and AVPP Internet site 24 may be combined at one physical location, with barriers between the real user information and virtual user information implemented via hardware and/or software controls, as described above, or other hardware/software controls known in the art, or not implemented at all, depending on specific design requirements.

Returning to FIG. 2, during operation of the AVPP system, user 30 provides funds or billing information to the funds collection site 28, and receives in return a funds ID, as described above. The funds ID may be a number and/or character sequence corresponding to a monetary amount, as describe above, or to a billing authorization based on the user's credit card limit, and the amount may be stored by the AVPP real world site 22 in the corresponding real user entry of RU/VU database 32. In some embodiments, the amount or limit of funds stored by the AVPP may be refilled by referencing the funds ID when the user transfers new funds or authorizes the billing of new funds. Upon such new transfer of funds or billing authorization, user 30 may refill the transaction account of the virtual entity using the same funds ID. The funds ID may be changed periodically for security purposes, in which case the user may receive a new funds ID which replaces the previous funds ID after the user's next visit to the AVPP Internet site. For example, user 30 may purchase a pre-printed credit card sized marker bearing the funds ID from a newsstand or Internet Café. In alternate embodiments, the funds collection site need not be included; for example, user 30 may transmit funds directly to the AVPP system, as described in detail above.

Reference is again made to FIG. 3. As described above, user 30 may establish one of two types of accounts with the AVPP system. The account may be fully anonymous, in that the AVPP system has no information that can be traced to the user, as explained above with reference to user 10 of FIG. 1, or the account may be partially anonymous, in that the AVPP system does include information which can be traced to the user, as explained above with reference to user 11 of FIG. 1. In either case, user anonymity when accessing the Internet is protected, as discussed in detail above. In the case of "full" anonymity, the real user entry in RU/VU 32 may include only the amount of money remaining, and the virtual user entry may include the funds ID code and, possibly, additional imaginary information defining a virtual entity, for example, a generic virtual personality that may be subsequently edited by the user. In case of a "partially" anonymous user, the real user entry in RU/VU 32 includes identifying information corresponding to the user, such as first and last name, billing and shipping address, credit card number and expiration date, while the virtual user entry in RU/VU 32 includes the funds ID code and imaginary information defining the virtual entity. As described above, the imaginary information may be initially blank, or generic information may be initially provided, and the user may subsequently edit this information through use of the AVPP Internet site 24.

Upon establishing an account, using any of the methods described above, such as in person, by phone, or through a SSL connection to an organ of the AVPP real world system, such as funds collection site 28, the AVPP system may issue to the user a virtual username (or access ID), and a virtual user password, which are stored at the virtual user entry in RU/VU 32. Thereafter, the virtual user access ID and password may be used by the user to interact with the AVPP Internet site in an anonymous manner. However, once the user logs on to the AVPP Internet site 24, the user may change the username and password, subject to availability of the new user name, as is known in the art. The new username and password is then updated within the AVPP system using the mechanisms described above, and so databases 36 and 32 of the AVPP real world site are also updated.

Without the information in the real user entry, 210 or 211, which is stored in the RU/VU database 32, and which corresponds to the real user, the virtual user access ID cannot be easily used to trace the identity of the user, as described in detail above. In the case of a completely anonymous user 10, no information exists in any of the databases operated by the AVPP system that be used to trace the identity of the user. Preferably, if the user desires, the virtual user information in databases 32, 36 and 40 is customizable by the user to correspond to a "personality" of the virtual user entry that the user wishes to present. For example, user 30 may choose to be "King Henry", and may provide additional information about this "make believe" character, such as virtual date of birth, virtual address, and the preferences of the "make believe" character in music, arts, science, etc., or any other information that the AVPP Internet site may be designed to receive. Some of the information may completely fictional, and some of the information may be real, for example, user 30 may prefer to have a virtual personality similar to the real personality, yet sufficiently different to protect the user's privacy. The virtual e-mail address of user 30 may either be randomly generated by the AVPP or may be customizable by the user. In some embodiments, the user may control the appearance and even the voice of the virtual entity, as described in detail above.

To implement the transaction accounts described above, each registered user of the AVPP system may be assigned a transaction ID by the AVPP, which may correspond to the number of the credit/debit card described above. The transaction ID may be used by user 30 to make purchases or collect funds in an anonymous manner from Internet sites. If the user expects to receive funds, for example, funds collected by the AVPP on behalf of the user from Internet sites, such funds may be added to the balance of the user's transaction account with the AVPP system. The transaction ID is preferably a credit card number registered with a credit card company or bank in the name of the organization operating the AVPP or an affiliate organization, as described above. The organization operating the AVPP or an affiliate organization may make an arrangement with a bank or other organization issuing transaction ID's to issue a certain number of transaction ID's in the name of the organization operating the AVPP or an affiliate organization, and to have such organization be responsible for the payment of charges associated with the transaction ID's. The AVPP in turn issues such transaction ID's to its users, as described above.

When making purchases via the Internet, the user may use its assigned transaction ID. A charge is registered with the transaction ID, and the relevant credit card company or bank bills the organization operating the AVPP. The AVPP organization, in turn, debits the user account corresponding to the user, which has been funded using a funds ID, a credit card, or other methods, as described above. In such a manner a user may make payments to an Internet organization, and the payment would be difficult to trace back to the user. This allows the user the freedom to shop on the Internet without taking the risk of being exposed, for example, if user 30 wishes to discreetly purchase products of a business competitor.

After a user account has been created for user 30, the user may access Internet sites via the AVPP Internet site, as described above. The user establishes a connection to the Internet 12, and connects to the AVPP Internet site 24, as described above, using a user terminal software module, such as Netscape Navigator®. Using the user terminal software module, user 30 connect to the AVPP Internet site 24 using known methods, e.g., by providing the user software module with the uniform resource locator ("URL") of the Web server 56 at the AVPP Internet site. The AVPP Internet site website provided by the Web server 56 (FIG. 4) typically provides the user with a series of website screens, which may include audio and video capability, and accepts information, including text, audio, and video, from the user terminal.

Figure 5:
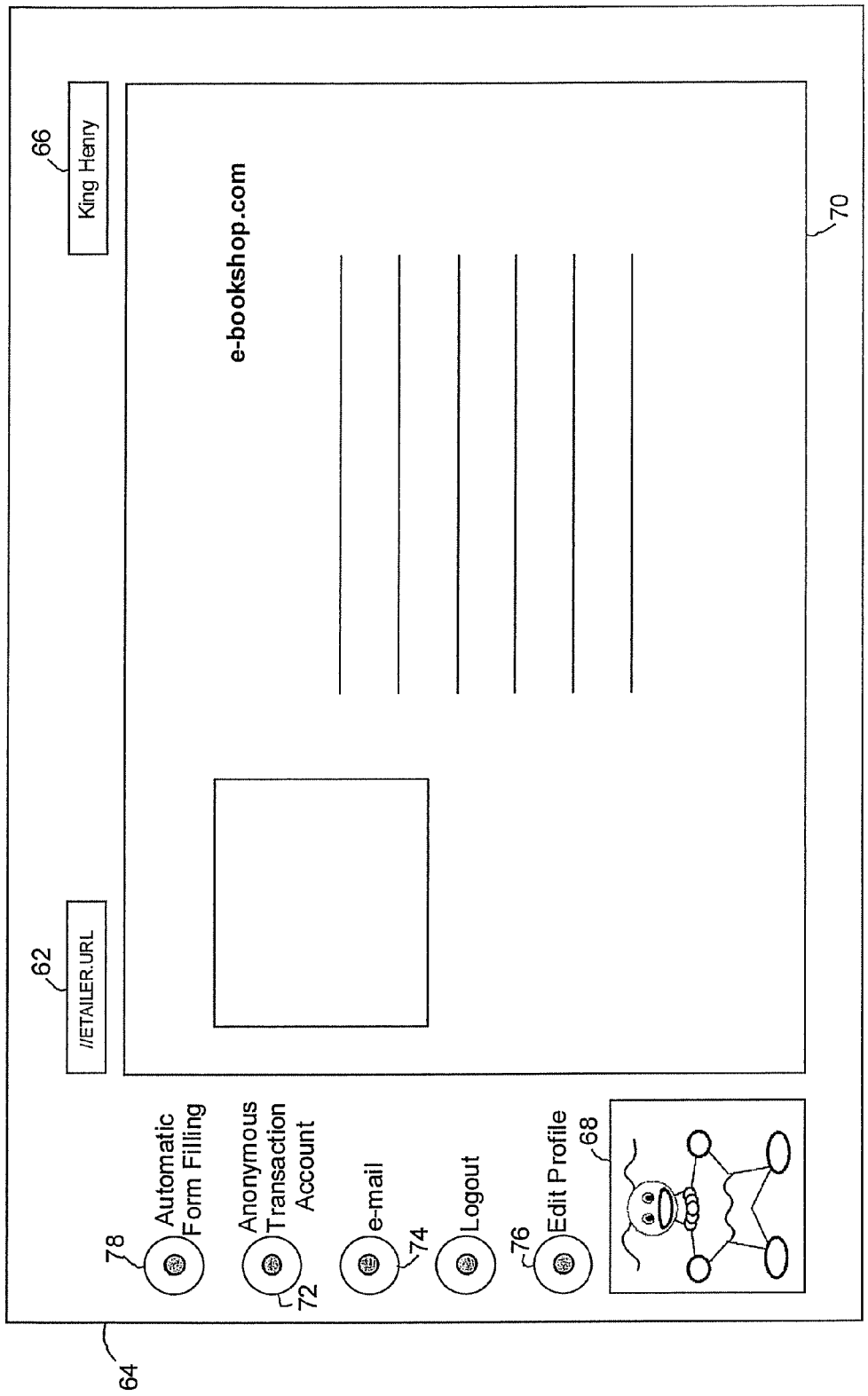
FIG. 5 is a schematic pictorial illustration of a virtual user interface generated by the AVPP Internet site of FIG. 4.

Reference is now made to FIG. 5, which schematically illustrates a virtual interface provided to a user upon logging on to the AVPP Internet site. The user logs on to the AVPP Internet site by presenting the virtual user access ID and virtual user access password to the AVPP Internet website. The user is then presented with an interface allowing the user to perform functions specific to the AVPP Internet site, as well as to access Internet sites. The user interface includes a border or frame area 64, which provides an interface for the user to perform functions such as maintenance of an anonymous virtual transaction account 72, accessing a virtual e-mail account 74 corresponding to the user's virtual e-mail address, editing a virtual personality profile 76 and viewing/editing an image 68 which represents the virtual personality, all of which functions are described above in detail. The border frame area 64 surrounds an anonymous browsing area 70, in which the user may access Internet sites in an anonymous manner. For example, to access e-tailer 14, the user enters the URL corresponding to the e-tailer in a field 62 of the AVPP Internet site, the website of the e-tailer is presented in the browsing area 70, and the user may interact with the website. The virtual entity's user name, such as "King Henry", or any other information from the virtual user entry in the AVPP databases may be displayed in a specified field 66. By scrolling through entries in field 66, user 30 may choose a different virtual entity for a given session. It should be appreciated that although the present invention does require user 30 to have more than one virtual personality, user 30 may nonetheless establish more than one anonymous account with the AVPP, wherein each account may be represented by a different virtual entity. Using multiple virtual entities, the user may play different roles on the Internet or present different personalities to different entities or in different situations, e.g., a man might pretend to be a woman, or vice versa, in a situation where a person of the opposite sex might gain a certain advantage. For example, a woman might feel more comfortable being a virtual "man" when participating in a "chat" about auto-mechanics, and a man might feel more comfortable being a virtual "woman" in a chat about cooking, or vice versa.

User input, such as keystrokes, is transmitted from the user terminal to the AVPP Internet site, and from the AVPP Internet site to the e-tailer. Preferably, no direct connection between the user terminal and e-tailer exists. Similarly, display information, such as text, graphics, or audio or video information, and in addition soft products such as software or audio recordings, may be transmitted from the AVPP Internet site to the user terminal. The user may access any other Internet site, such as the Internet sites 14-18 described above. According to an embodiment of the invention, when interacting with the Internet sites, the user uses only identity or personality information corresponding to the virtual entity, as stored in database 40 (FIG. 4), and preferably no information corresponding to the real user's identity.

In a typical Internet user session, using current systems and methods, a site visited by a user may request and record personal or identifying information regarding the user, such as a user's name, address, telephone numbers and e-mail address. Often such information is a prerequisite for use of Internet sites, for example, a user may be required to enter an e-mail address to access an otherwise free database. According to an embodiment of the system and method of the present invention, the information a user presents to an Internet site when using the AVPP Internet site is the virtual identity stored at the virtual user entry in virtual personality database 40. This information is imaginary and cannot be traced back to real user 30 and, thus, the real user may avoid the potentially adverse repercussions of disclosing real information to an untrusted website. Further, since the virtual entity is readily available from the virtual personality database, the user does not need to spend valuable time inventing false information to submit to the website. In some preferred embodiments of the invention, the virtual entity information stored in the virtual personality database 40 may be uploaded automatically to the website requesting the information, using link 78 on the AVPP Internet site user interface. This aspect of the invention may be implemented based on existing software solutions for automatic form-filling. Such software solutions exist for filling out forms automatically on many internet sites, and are designed and used for filling out correct information; however, it will be appreciated by persons skilled in the art that such software solutions are equally suitable for filling out the virtual user information in accordance with the present invention, and that such software solutions may be incorporated into the AVPP system with only minor modifications. It should be noted that although there is more than one standard on the Internet for filling out forms, and although different websites may use different types of virtual user interface, the automatic form-filling feature of the present invention would still benefit the users in most situations.

While in current systems a user may present false information to an Internet site, such as a false name, e-mail address or credit card information, the user will not gain the full benefit of the site to the extent that the Internet site actually uses such information. For example, a false credit card number will not be authorized by any credit card company, and is thus not useful to purchase goods or services, and information the user desires which is sent to a false e-mail address will not reach the user. According to the system and method of the present invention, the virtual identity stored in the virtual user entry includes "false" information, such as a virtual transaction ID or virtual e-mail address, which are on the one hand valid items of information, but which on the other hand are not easily traceable to the user who "owns" the virtual information. When interacting with Internet sites, the Internet sites may transmit information to a virtual e-mail address or exchange funds with a virtual transaction ID. In order to access the information, products or funds thus transmitted, the user interacts only with the AVPP Internet site 24, thereby preserving the user's anonymity.

For example, after logging on to the AVPP Internet site and accessed an e-tailer as described above, user 30 may wish to purchase a "soft" product such as an audio or video recording that may be downloaded from the e-tailer for a fee. The user 30 interacts with the e-tailer in a known manner, but when asked for identifying information enters identifying information corresponding to the virtual entity stored in the virtual personality database, including the virtual transaction account information. The e-tailer uses the virtual transaction ID to access the proper amount of funds. For example, in the case that the virtual transaction ID is a valid credit card number, the e-tailer charges the credit card number via known methods, and the corresponding credit card company debits the credit card account, which is preferably in the name of the organization operating or associated with the AVPP Internet site. The amount of the transaction is debited to the virtual transaction account of the user in the AVPP databases, as discussed in detail above. Once the transaction has been authorized by the credit card company, and preferably also by the AVPP transaction processing system described above, the e-tailer releases the "soft" product, i.e., enables the user to download the "soft" product. Neither the exchange of funds nor the exchange of goods allows the e-tailer access to information which may identify the user. In addition, the transfer of funds and goods or services in the above manner does not allow access to the information by entities other than the e-tailer, for example, intruder 20.

Alternatively, user 30 may wish to purchase from the e-tailer goods that require shipping, such as a book or a toaster. The user interacts with the e-tailer in a known manner, but when asked for identifying information enters identifying information corresponding to the virtual entity stored in the virtual personality database, including the virtual transaction account information and the virtual shipping address. However, the virtual entity preferably includes a correct entry for the zip code of the real user, as described above with reference to FIGS. 1 and 2. The e-tailer uses the virtual transaction ID to access the proper amount of funds. For example, in the case that the virtual transaction ID is a valid credit card number, the e-tailer charges the credit card number via known methods, the corresponding credit card company debits the credit card account, which is preferably in the name of the organization operating or associated with the AVPP Internet site. The amount of the transaction is debited to the virtual transaction account of the user in the AVPP databases, as discussed in detail above. Once the transaction has been authorized by the credit card company, and preferably also by the AVPP transaction processing system described above, the e-tailer prepares the product for shipping at the optimal dispatch site, because the e-tailer has the correct zip code for the real user's shipping address, but the e-tailor does not know who user 30 is or the destination address for the goods. The shipping company, which preferably operates or is associated with the AVPP real world site organization, as described above, identifies the shipment as being for a user of the AVPP system and sends the virtual shipping address to the shipping processing division 34 of the AVPP real world site 22 (FIG. 2). The shipping processing division 34 retrieves the correct shipping address of the user from the real user entry in the RU/VU database, based on the virtual user shipping address sent from the shipping company, and sends the correct shipping address back to the shipping company. The shipping company then ships the goods from the optimal dispatch site to the correct shipping address of user 30. As in the previous example, neither the exchange of funds nor the exchange of goods allows the e-tailer access to information which may identify the user. In addition, the transfer of funds and goods or services in the above manner does not allow access to the information by entities other than the e-tailer, for example, intruder 20. Further, the shipping system, which may include both the shipping division 34 of the AVPP real world site 22 and a third party shipper, does not operate over standard internet connections and, therefore, the user 30 is not exposed to a greater privacy risk than in an equivalent off-Internet shipping situation, e.g., if the goods were ordered in person at a store or over the telephone. It should be appreciated that other implementation of an anonymous or partially anonymous shipping system, for example, the provision of a physical mailbox registered to the virtual entity, as described above, are also within the scope of the present invention.

It should be apparent to those skilled in the art that the AVPP system of the present invention also enables the user 30 to privately engage in any other Internet interaction, specifically, interactions that do not require transfer of funds and/or goods between the user and other entities, such as chatting, surfing, e-mailing, building websites, etc., using a virtual identity, without compromising the real user information.

It will be appreciated by persons skilled in the art that the present invention is not limited by the specific preferred embodiments of the invention described above with reference to the accompanying drawing. Rather, the present invention is limited only by the following claims:

The invention claimed is:

1. A virtual entity comprising:
    a memory having stored therein virtual identification data defining the virtual entity,
    wherein said virtual entity is accessible via one or more sites of a communication network and is controllable by a real entity using at least one of said sites,
    wherein said virtual entity is assigned a virtual transaction account associated with said virtual identification data,
    wherein said virtual transaction account has authorization to perform a transaction of monetary value with one or more other entities over said communication network,
    and wherein said virtual identification data does not identify said real entity to said one or more other entities over said communication network.

2. The virtual entity of claim 1, wherein said virtual identification data includes at least a name uniquely identifying said virtual entity, a password, and a history of activities of said virtual entity on a communication network site.

3. The virtual entity of claim 1, wherein said virtual identification data includes virtual-entity data for interaction of the virtual entity, as a real entity, with at least one service, without revealing to said service the identity of said real entity, the at least one service including one or more of an electronic-mail (e-mail) service, a shopping service, a chat service, an Internet surfing service, a multi-user service, a gaming service, a dating service, and a search service.

4. The virtual entity of claim 3, wherein the virtual-entity data includes at least one of an e-mail account username, an e-mail account password, credit card information, an address, a billing address, a shipping address, a social security number, and an identification number.

5. The virtual entity of claim 1, wherein said virtual identification data includes one or more predefined virtual entity attributes defining a unique virtual entity personality, and wherein the virtual entity attributes include at least one of an image, a voice pattern, a physical characteristic of the virtual entity, profession information relating to a profession of the virtual entity, a date of birth of the virtual entity, and one or more preferences of the virtual entity in one or more fields of interest.

6. A system to control interaction of at least one virtual entity on behalf of at least one real entity via one or more communication network sites, the system comprising:
    a memory having stored therein virtual identification data defining at least one profile of at least said one virtual entity, said profile including at least a virtual name uniquely identifying said virtual entity, a password, and a history of activities of said virtual entity on said site, wherein said profile does not reveal the identity of said real entity; and
    a server to control interaction of said virtual entity on behalf of said real entity via said site using said profile, based on input received from said real entity.

7. The system of claim 6, wherein the profile includes virtual-entity data for interaction of the virtual entity, on behalf of the real entity, with at least one service on said communication network sites, without revealing to said service the identity of said real entity, and wherein the at least one service includes one or more of an electronic-mail (e-mail) service, a shopping service, a chat service, an Internet surfing service, a multi-user service, a gaming service, a dating service, and a search service.

8. The system of claim 7, wherein the virtual-entity data includes at least one of an e-mail account username, an e-mail account password, credit card information, an address, a billing address, a shipping address, a social security number, and an identification number.

9. The system of claim 6, wherein the profile of the virtual entity includes a unique virtual entity personality defined by one or more predefined virtual entity attributes.

10. The system of claim 9, wherein the virtual entity attributes include at least one of an image, a voice pattern, a physical characteristic of the virtual entity, profession information relating to a profession of the virtual entity, a date of birth of the virtual entity, and one or more preferences of the virtual entity in one or more fields of interest.

11. The system of claim 6, wherein the profile of the virtual entity includes virtual-entity transaction data assigned to said virtual entity, and wherein the server is adapted to perform a transaction of monetary value with a communication network service on behalf of said virtual entity by providing said virtual-entity transaction data to said communication network service, without revealing billing data of said real entity.

12. The system of claim 6, wherein the server is adapted to verify an attempt of said real entity to access the virtual entity based on the password assigned to the virtual entity.

13. The system of claim 6, wherein the history of activities includes at least one of a surfing history, a spending history, a conversation content, and a cookie.

14. A system of providing one or more virtual entities capable of transacting on at least one communication network site, the system comprising:

a memory having stored therein virtual identification data defining a virtual entity and virtual-entity transaction data assigned to said virtual entity; and a server to control activities of said virtual entity on said site, based on input from a real entity, without identifying said real entity, wherein the server is adapted to facilitate a transaction of monetary value between said virtual entity and another entity on said communication network site by providing said virtual-entity transaction data to said site, without revealing billing data of the real entity.

15. The system of claim 14, wherein the server is adapted to limit transactions of said virtual entity to a prepaid amount of money associated with the virtual entity.

16. The system of claim 14, wherein the server is adapted to maintain a real user account of the real entity.

17. The system of claim 14, wherein the virtual-entity transaction data includes transaction data fields comparable to the transaction data fields used for transactions of real entities.

18. The system of claim 17, wherein the virtual-entity transaction data includes viable credit card information.

19. The system of claim 17, wherein the virtual-entity transaction data includes a mailing address uniquely associated with the virtual entity and not revealing a real mailing address of the real entity.

* * * * *